(12) United States Patent
Witte (10) Patent No.: US 9,604,418 B2
(45) Date of Patent: Mar. 28, 2017

(54) METHOD AND APPARATUS FOR REPAIRING COMPOSITE COMPONENTS

(71) Applicant: Airbus Operations GmbH, Hamburg (DE)

(72) Inventor: Tassilo Witte, Stade (DE)

(73) Assignee: Airbus Operations GmbH, Hamburg (DE)

( * ) Notice: Subject to any disclaimer, the term of this patent is extended or adjusted under 35 U.S.C. 154(b) by 62 days.

(21) Appl. No.: 14/560,671

(22) Filed: Dec. 4, 2014

(65) Prior Publication Data
US 2015/0151498 A1 Jun. 4, 2015

(30) Foreign Application Priority Data

Dec. 4, 2013 (EP) .................................. 13 195 600

(51) Int. Cl.
| | | |
|---|---|---|
| *B29C 73/02* | (2006.01) | |
| *B29C 73/34* | (2006.01) | |
| *B64C 1/06* | (2006.01) | |
| *B29L 31/30* | (2006.01) | |
| *B64C 1/00* | (2006.01) | |
| *B29K 101/10* | (2006.01) | |
| *B29K 105/08* | (2006.01) | |

(Continued)

(52) U.S. Cl.
CPC .............. *B29C 73/02* (2013.01); *B29C 73/34* (2013.01); *B64C 1/06* (2013.01); *B29C 35/045* (2013.01); *B29C 35/16* (2013.01); *B29C 2035/0838* (2013.01); *B29C 2035/0855* (2013.01); *B29C 2791/005* (2013.01); *B29K 2101/10* (2013.01); *B29K 2105/08* (2013.01); *B29L 2031/3076* (2013.01); *B29L 2031/3082* (2013.01); *B64C 2001/0072* (2013.01)

(58) Field of Classification Search
CPC ....... B29C 73/02; B29C 73/34; B29C 35/045; B29C 35/16; B64C 1/06
See application file for complete search history.

(56) References Cited

U.S. PATENT DOCUMENTS 6,385,836 B1 * 5/2002 Coltrin .................. B29C 70/545
156/285
2,594,391 A1 5/2013 Giraud et al.

FOREIGN PATENT DOCUMENTS

| DE | 39 03 153 | 8/1990 |
|---|---|---|
| DE | 10 2012 207468 | 11/2013 |

(Continued)

OTHER PUBLICATIONS

European Search Report for Application No. 13 19 5600 dated Jun. 23, 2014.

*Primary Examiner* — Justin Benedik
(74) *Attorney, Agent, or Firm* — Jenkins, Wilson, Taylor & Hunt, P.A.

(57) ABSTRACT

A method of repairing an affected area of a component of a fiber-reinforced polymer composite, especially having elongate or continuous reinforcing fibers in a polymer matrix, is disclosed. The method includes: providing a controlled atmosphere around the affected area of the component; heating the component in the affected area within the controlled atmosphere to cause pyrolysis or depolymerization of the polymer matrix in the affected area and thereby to remove the polymer matrix from the affected area; introducing polymer resin into a space left by the pyrolyzed or depolymerized matrix to refill the affected area.

17 Claims, 4 Drawing Sheets

(51) Int. Cl.
   *B29C 35/04* (2006.01)
   *B29C 35/16* (2006.01)
   *B29C 35/08* (2006.01)

(56) References Cited

FOREIGN PATENT DOCUMENTS

| EP | 0 233 755 | 8/1987 | | |
|----|-----------|--------|---|---|
| EP | 1 531 035 | 5/2005 | | |
| EP | 1531035 | * 5/2005 | ........... | B29C 66/022 |
| EP | 2 261 012 | 12/2010 | | |
| EP | 2 594 391 | 5/2013 | | |
| FR | 2 950 079 | 3/2011 | | |
| FR | 2 985 680 | 7/2013 | | |

* cited by examiner

METHOD AND APPARATUS FOR REPAIRING COMPOSITE COMPONENTS

CROSS-REFERENCE TO RELATED APPLICATION

This application claims the benefit of and priority to European Patent Application No. 13 195 600.5 filed Dec. 4, 2013, the entire disclosure of which is incorporated by reference herein.

TECHNICAL FIELD

The present disclosure relates to a method and apparatus for repairing composite components, especially fiber-reinforced polymer or plastic components with continuous fibers.

BACKGROUND

The use of composite materials in the design and manufacture of aircraft and spacecraft is becoming increasingly prevalent due to the low-weight and relatively high-strength properties achievable with those materials, among which fiber-reinforced polymer composites, such as carbon fiber reinforced polymers (CFRP), are especially preferred. An important issue with the use of fiber-reinforced polymer composite materials in modern aircraft production concerns the repair of such components; i.e. when those components are found to have a defect or if they sustain damage due to an inadvertent impact. Clearly, it will generally be preferable to repair a component having a small defect or minor damage rather than replace an entire component, especially for larger or more complex components.

Current techniques for repairing damaged CFRP components in the aircraft industry involve removing an affected area (e.g. a damaged area or a defective area) from the component and inserting a ply doubler. This has the notable disadvantage, however, that elongate or continuous reinforcing fibers of the component extending through the affected area are cut or severed. In order to achieve a corresponding load-carrying or load-transfer capability in this area, therefore, the repair is required to substantially reinforce the component in this area.

SUMMARY

The method and apparatus of the disclosure herein are directed to redressing this problem and are especially suitable for use in the aircraft and aerospace industries. It will be noted, however, that the method and the apparatus of the disclosure herein are not limited to the aircraft and aerospace industries, but may be used in a range of applications where fiber-reinforced polymer composites are employed.

According to one aspect, therefore, the disclosure provides a method of repairing a component of a fiber-reinforced polymer composite, especially with elongate or continuous reinforcing fibers in a polymer matrix, the method comprising:
  providing a controlled atmosphere around an affected area of the component;
  heating the component in the affected area within the controlled atmosphere to cause pyrolysis or depolymerization of the polymer matrix in the affected area, thereby to remove the polymer matrix from the affected area; and
  introducing polymer resin into a space left by the matrix removed by pyrolysis or depolymerization to refill the affected area.

For the sake of clarity, it will be appreciated that the term "affected area" used in relation to the present disclosure may be understood to include a damaged area, being an area of the component that may have been subject to a damaging influence, such as a physical impact, and/or a defective area, being an area of the component that may include some physical defect, such as an inclusion, e.g. due to a manufacturing process.

The repair method of the disclosure has the advantage that the polymer matrix material can be removed from the affected area of the component while leaving the reinforcing fibers in that area intact. That is, the elongate or continuous reinforcing fibers in the affected area are not severed or cut or removed but rather remain substantially unchanged in the space left upon removal of the matrix by pyrolysis or depolymerization. For this reason, the polymer resin introduced into that space can again be infused into those fibers, which are later then able to transmit loading through that area of the component as before. This can provide a very high quality repair with physical and structural properties at the repaired area being essentially the same as an unaffected area of the component.

In a further embodiment, the step of providing a controlled atmosphere around the affected area of the component includes locally enclosing or isolating the affected area of the component, for example, by arranging the affected area within a treatment chamber or cavity. Further, the step of providing a controlled atmosphere preferably includes filling a chamber or cavity that locally encloses or isolates the affected area with a relatively inert or non-reactive gas or gas mixture, such as nitrogen gas. In this way, the chamber or cavity of inert or non-reactive gas or gas mixture forms the controlled atmosphere around the affected area, within which a pyrolysis or depolymerization of the polymer matrix may take place. An unwanted oxidization or burning of the matrix material can thereby be avoided as the repair method of the disclosure is carried out.

In a further embodiment, the step of heating the component in the affected area comprises applying energy locally to the affected area to heat the polymer matrix. In this regard, the localized application of energy preferably involves applying one or more of: a direct heat source, such as a stream of hot gas, and/or indirect heating via microwave energy, such as a microwave beam, or laser energy, such as a laser beam. The polymer resin matrix of the component in the affected area is preferably heated to a temperature in the range of about 300° C. to 700° C., more preferably about 450° C. to 600° C.

In another embodiment, the step of heating the component in the affected area includes controlling or regulating the temperature of the component in the affected area. This may, for example, include sensing a temperature on or adjacent to the affected area of the component and adjusting the degree of heating to maintain the temperature within a range of pre-defined upper and lower limits. The heating step preferably also includes substantially confining or limiting the heating to the affected area. In one embodiment, this may be achieved by insulating or isolating other regions of the component from the locally applied energy, such as by cooling a periphery of the affected area.

In a further embodiment, the method comprises the preliminary step of providing at least one hole or bore which penetrates through the component in the affected area. Each hole or bore may, for example, be drilled through the affected area. The at least one hole or bore then enables the controlled atmosphere to penetrate through the component, and also enables heat provided directly (e.g. in a hot gas) to penetrate through the affected area and into a central region of the polymer matrix.

In another embodiment of the disclosure, the method step of introducing polymer resin includes covering at least one side of the space in the affected area left by the pyrolyzed or depolymerized matrix with a molding tool to form a mold cavity; and infusing or injecting polymer resin (i.e. in liquid or fluid form) into the mold cavity to re-fill the space. As may be expected, the molding tool will preferably follow a desired contour of the component in the affected area. After the fluid polymer resin has been infused into the reinforcing fibers in the space created, the resin is then preferably cured in the mold cavity. The curing step will typically take place in an autoclave or oven as is known in the art.

In a further embodiment of the disclosure, the method may further include the step of preparing a peripheral edge around the space left by removal of the polymer matrix by pyrolysis or depolymerization to form a profile or shape with which the new resin introduced into the mold cavity may form a mechanical connection in the component. For example, preparation of the peripheral edge could include machining or modifying the edge region to form one or more slot, groove, shoulder, or other profile or shape to assist integration of the newly introduced polymer resin in the component.

The material of the polymer matrix is usually a polymer resin such as a thermosetting resin, and can be selected from the group consisting of epoxy, polyester, vinyl ester, and nylon resins. As noted above, the reinforcing fibers can be selected from the group of carbon fibers, glass fibers and aramid fibers. Thus, the fiber-reinforced polymer (FRP) can be a carbon fiber reinforced polymer (CFRP), and/or a glass fiber reinforced polymer (GFRP), and/or an aramid fiber reinforced polymer (AFRP).

According to another aspect, the present disclosure provides an apparatus for use in repairing an affected area of a component of fiber-reinforced polymer composite, especially having elongate or continuous reinforcing fibers in a polymer resin matrix, the apparatus comprising:
 a casing with a treatment chamber or cavity configured to surround or encompass the affected area of the component;
 an inlet into the casing for introducing a controlled atmosphere into the treatment chamber or cavity surrounding or encompassing the affected area; and
 a heating device for local application of energy to the affected area within the treatment chamber or cavity to effect pyrolysis or depolymerization of the polymer matrix in the affected area.

In another embodiment, the casing may be configured to enclose and/or isolate the affected area of the component. In this regard, walls of the casing define the treatment chamber or cavity. Furthermore, the casing is desirably configured to enclose and/or isolate the affected area at opposite sides of the component. To this end, the casing may have a first part and a second part for respectively mounting at opposite sides of the component, wherein the first and second parts of the casing together define the treatment chamber or cavity. In this regard, the casing may include a mounting mechanism for mounting the casing on or adjacent to the component, e.g. such that a first part of the casing is mounted to cover one side of the affected area and a second part of the casing is mounted to cover an opposite side of the affected area.

In another embodiment, the apparatus further comprises an insulator device for substantially confining or limiting heat generated by the heating device to the affected area. To this end, the insulator can include a cooling arrangement for cooling at or around a periphery of the casing which surrounds or encompasses the affected area so as to insulate other parts of the component from the heat generated by the heating device.

In another embodiment, the apparatus further comprises a molding tool for covering at least one side of the space in the affected area from which the pyrolyzed or depolymerized matrix is removed. Thus, the molding tool is configured to form a mold cavity with the component, and the molding tool typically follows a desired contour of the component in the affected area.

According to a further aspect, the present disclosure provides a component that is repaired by a method and/or apparatus of the present disclosure according to any one of the embodiments described above. In another aspect, the disclosure provides a vehicle, such as an aircraft or spacecraft, with an airframe or fuselage structure including at least one component that has been repaired by a method or apparatus of the disclosure according to any of the embodiments described above.

BRIEF DESCRIPTION OF THE DRAWINGS

For a more complete understanding of the present disclosure and the advantages thereof, exemplary embodiments of the disclosure are explained in more detail in the following description with reference to the accompanying drawings, in which like reference characters designate like parts and in which.

DETAILED DESCRIPTION

The accompanying drawings are included to provide a further understanding of the present disclosure and are incorporated in and constitute a part of this specification. The drawings illustrate particular embodiments of the disclosure and together with the description serve to explain the principles of the disclosure. Other embodiments of the disclosure and many of the attendant advantages of the disclosure will be readily appreciated as they become better understood with reference to the following detailed description.

It will be appreciated that common and/or well understood elements that may be useful or necessary in a commercially feasible embodiment are not necessarily depicted in order to facilitate a more abstracted view of the embodiments. The elements of the drawings are not necessarily illustrated to scale relative to each other. It will further be appreciated that certain actions and/or steps in an embodiment of a method may be described or depicted in a particular order of occurrences while those skilled in the art will understand that such specificity with respect to sequence is not necessarily required. It will also be understood that the terms and expressions used in the present specification have the ordinary meaning as is accorded to such terms and expressions with respect to their corresponding respective areas of inquiry and study, except where specific meanings have otherwise been set forth herein.

Figure 1:
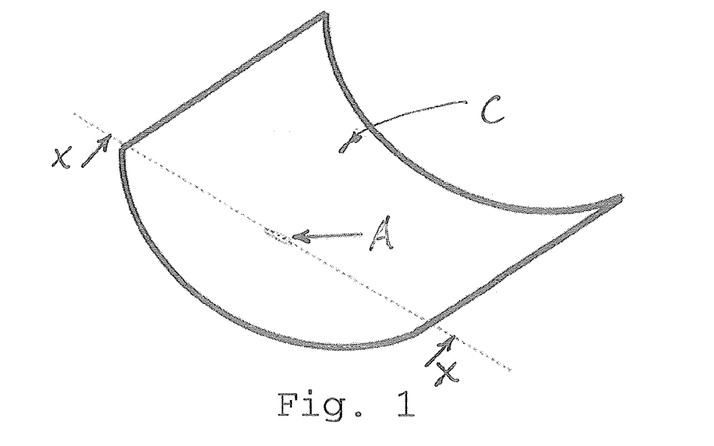
FIG. 1 is a schematic perspective view of a component of a fiber-reinforced polymer composite having a damaged area.
Figure 2:
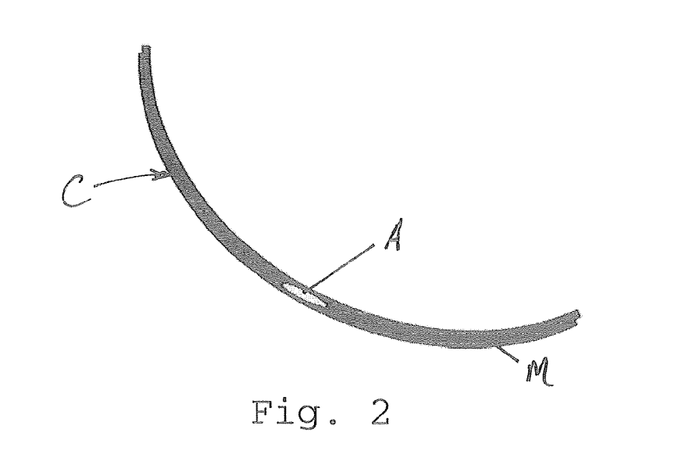
FIG. 2 is a cross-sectional side view of the component of FIG. 1 in a direction X-X showing the damaged area.

Referring first to FIG. 1 of the drawings, a composite component C is shown in the form of a curved CFRP panel that may, for example, form a section of a fuselage structure for an aircraft. The CFRP panel component C comprises multiple layers of elongate or continuous reinforcing fibers F (e.g. in the form of woven carbon fiber fabric sheets) embedded within a polymer resin matrix M and includes a damaged area A shown in a cross-section in FIG. 2 taken in the direction of the arrows X-X illustrated in FIG. 1. The damaged area A may, for example, have been caused by a physical impact and could include a delamination of one or more layers of the carbon fibers F within the polymer matrix M and/or a fracture in the polymer matrix M itself.

Figure 3:
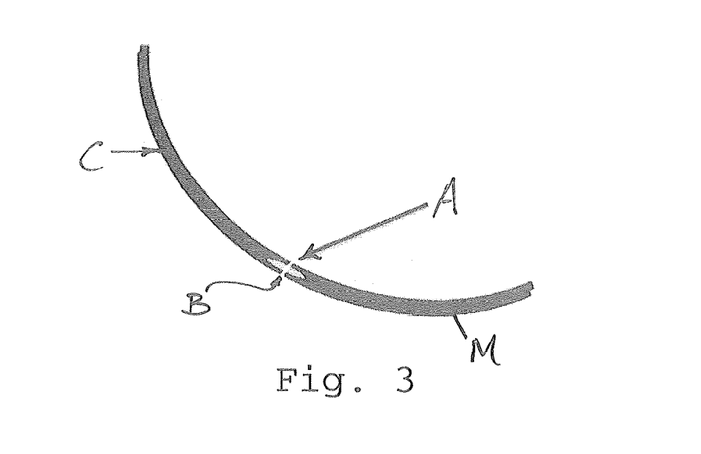
FIG. 3 is a cross-sectional side view of the component of FIG. 1 in the direction of arrows X-X and shows a bore or hole formed through the damaged area.

In performing or conducting a repair of the damaged area A according an embodiment of this disclosure, a preliminary step includes forming (for example, by drilling) at least one hole or bore B through the component C in the damaged area A, as shown in FIG. 3. The hole or bore B is typically relatively fine or small and in the case of a small damaged area A, only one such hole or bore B may be required, e.g. centrally of the damaged area A. In a larger damaged area A, however, two or more such holes or bores B may optionally be formed. Each hole or bore B thus provides fluid communication through the panel component C in the damaged area A.

Figure 4:
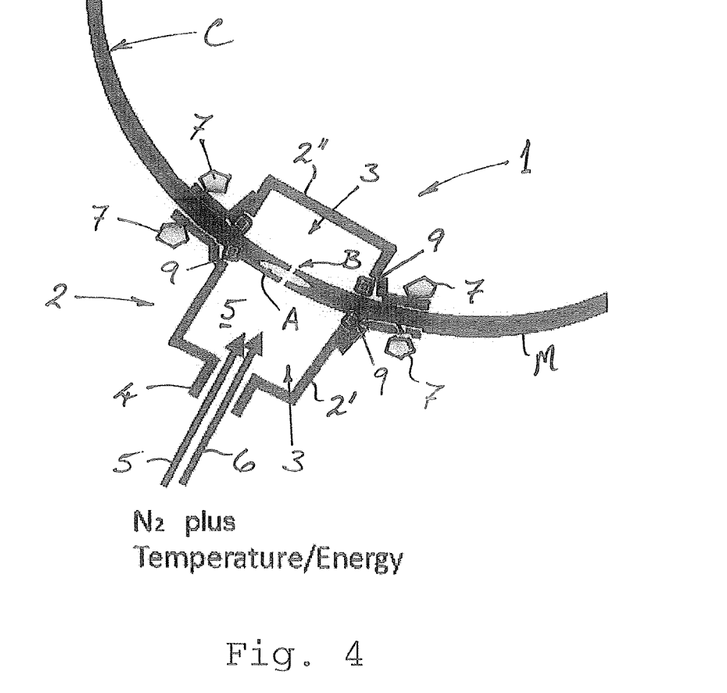
FIG. 4 is a cross-sectional side view of an apparatus of a preferred embodiment of the disclosure deployed with the component of FIG. 1.
Figure 5:
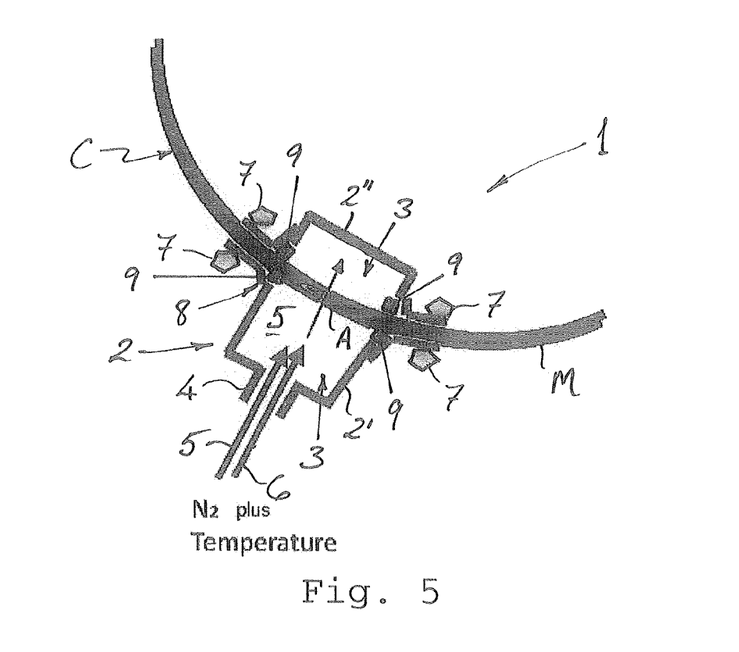
FIG. 5 is a cross-sectional side view of the apparatus of FIG. 4 in use.

With reference now to FIGS. 4 and 5 of the drawings, an apparatus 1 for use in repairing the damaged area A of the panel component C is illustrated deployed and in operation in the damaged region A of the panel component. The apparatus 1 comprises a casing 2 having a first part 2' mounted on a first (e.g. front) side of the panel component C and a second part 2" mounted on a second, opposite (e.g. rear) side of the panel. The casing 2 is configured to enclose and/or isolate the damaged area A of the panel component and the first and second parts 2', 2" of the casing 2 together form or define a treatment chamber or cavity 3 which substantially surrounds or encompasses the affected area A of the panel.

Further, the apparatus 1 includes an inlet 4 in the casing 2 for introducing a gas or a gas mixture into the treatment chamber or cavity 3 to provide a controlled and essentially inert atmosphere 5 within that chamber or cavity 3. In this regard, nitrogen gas ($N_2$) is particularly preferred for the controlled atmosphere. The at least one hole or bore B formed through the damaged area A in the panel component C enables the nitrogen gas ($N_2$) to pass through the component C into the second or rear portion of the treatment chamber 3 defined by the second casing part 2", thereby enabling the treatment chamber 3 in the casing 2 to be filled with nitrogen gas ($N_2$) and thus provide the non-reactive atmosphere 5 throughout the treatment chamber 3. As will be understood by persons skilled in the art, the rear part 2" of the casing 2 may include an outlet (not shown) for the gas ($N_2$) to exit the chamber 3 and then be recirculated back to the inlet 4 to be re-introduced into the casing 2.

As can be seen in FIGS. 4 and 5 of the drawings, the method and apparatus 1 of the disclosure involves a localized heating of the panel component C in the damaged area A within the controlled atmosphere 5 contained within the casing 2. The heating mechanism 6 according to this preferred embodiment of the disclosure may comprise a physical heat source, such as a stream of hot gas, which may be precisely directed onto the damaged area A of the component C. Indeed, it is contemplated that the hot gas stream 6 may also comprise the nitrogen gas used to generate the controlled atmosphere 5. Alternatively, or in addition, the heating mechanism 6 may be configured to apply energy in other forms in a localized or focused manner onto the damaged area A. For example, that heating energy may be in the form of a microwave beam and/or a laser beam, which may also be introduced into the casing 2 via the inlet 4, as described previously. As will be appreciated, however, the apparatus 1 may include a separate inlet, introduction point, or source for the energy to be applied to the damaged area A.

With reference to drawing FIG. 5, the particular embodiment illustrated includes a hot gas stream 6 as the energy source for directly heating the damaged area A within the treatment chamber 3. In this connection, the stream of hot gas 6 may penetrate the panel component C through the at least one hole or bore B drilled through the damaged area A as a preliminary step. As such, the hot gas, typically having a temperature in a range of 400° C. to 600° C., can pyrolyze or depolymerize the polymer resin of the composite matrix M both at the first side and the second side as well as through the core of the panel component C within the casing 2 of the apparatus. As noted above, the second part 2" of the casing 2 may include an outlet (not shown) for the hot gas 6 to be recirculated in the treatment chamber 3—i.e. back to the inlet 4 to be re-introduced into the casing 2.

The first and second casing parts 2', 2" of the apparatus 1 may be mounted on and secured to the panel component C by non-contact fastening elements 7, such as strong magnets. In this way, a strong magnetic attraction between the fastening elements 7 on opposite side of the panel component C operates to hold the first and second parts 2', 2" of the casing 2 fixed in position on opposite sides of the panel C without the need for any physical penetration or damage to the panel. As resilient sealing members (not shown) are typically also desired to avoid any gas leak from the atmosphere 5 generated within the treatment chamber 3, the resilient sealing members are typically provided between the first and second casing parts 2', 2" and the panel component C, respectively, which also serve to avoid any superficial stretching or damage to the panel C by the strong magnetic attraction of the non-contact fastening elements 7.

In order to limit or confine the heating of the polymer resin matrix M to the damaged area A enclosed by the casing 2, the apparatus 1 also incorporates an insulator device 8 which is configured to provide cooling to the panel component around a periphery of the damaged area A. In this regard, each of the first and second parts 2', 2" of the casing 2 includes a cooling circuit or channel 9 for circulating a cooling liquid in thermal contact around a periphery of the damaged area A. This cooling circuit 9 thus prevents an undesired extension of the pyrolysis or depolymerization of the resin matrix M beyond a predetermined extent.

Figure 6:
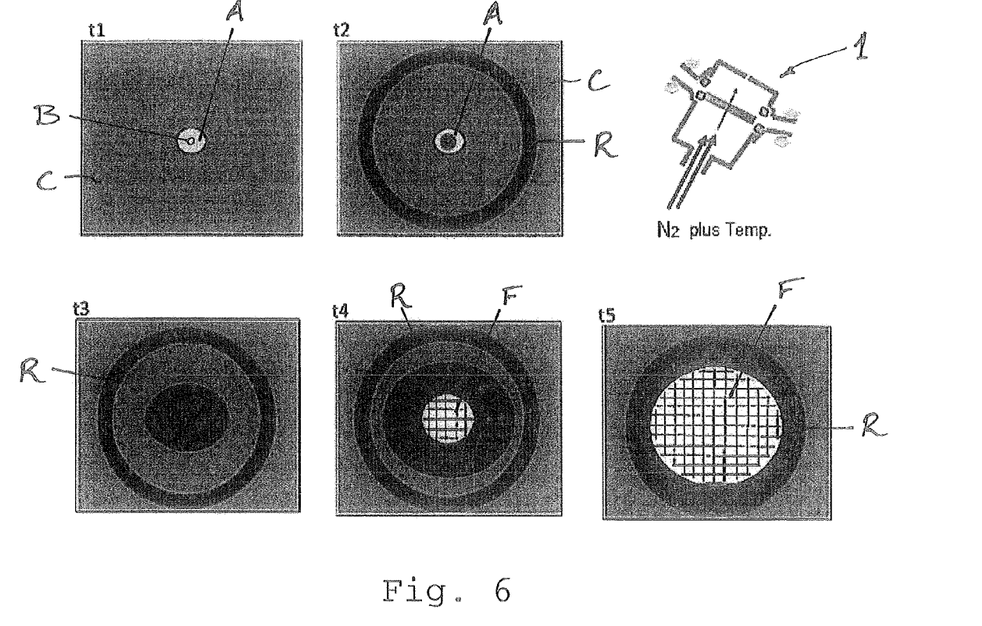
FIG. 6 is a series of images t1 to t5 illustrating stages in the use or operation of the apparatus of FIG. 4.

With reference now to FIG. 6 of the drawings, a series of images t1 to t5 illustrate the progress (i.e. over time) of the pyrolysis or depolymerization that occurs with the method and apparatus 1 according this preferred embodiment. In this regard, the image t1 illustrates the damaged area A in the panel component C together with the hole or bore B formed centrally through the damaged area (i.e. as shown in FIG. 3) before the apparatus 1 is mounted on the panel component C. The image t2 in FIG. 6 then represents that the apparatus 1 of FIGS. 4 and 5 (shown in miniature next to the image t2) is mounted onto the panel C as described above. The darkened region in the middle of the damaged area A represents a start or early stage of heating within the controlled atmosphere 5 of the chamber 3 in the casing 2 by the introduction of a hot gas stream 6 (or other localized heating, such as a microwave beam) onto and through the damaged area A. Regions of the panel component C remote from damaged area A, however, are thermally insulated from the heating with the apparatus 1 via the cooling circuit 9 in the casing 2, as is represented by the dark circular ring R spaced from the damaged area A.

The image t3 of FIG. 6 shows that the heated region of resin matrix M in and around the damaged area A has grown, as represented by the central darkening of the polymer matrix M. In other words, the resin matrix M in the damaged area now typically has a highly elevated temperature (e.g. in a range of about 450° C. to 600° C.) in the controlled atmosphere 5 of the treatment chamber 3 due to the heat source 6 directed onto the damaged area A. In the image t4 of FIG. 6, it can be seen that a pyrolysis or depolymerization of the resin matrix M progresses to such an extent under a continuous influence of the heating mechanism, that the polymer matrix M is slowly but increasingly removed from the panel component C in the damaged area A. In this regard, the pyrolyzed matrix material may be removed or carried away from the damaged area A by the gas stream 5, 6 to an outlet (not shown) in the rear casing part 2", from which it is then exhausted from the casing 2. The reinforcing fibers F in the layers of woven carbon fiber fabric embedded within the polymer matrix M, however, remain essentially unaffected by the elevated temperature in the matrix material. As such, the degradation and removal of the polymer matrix M by this pyrolysis or depolymerization simply exposes the reinforcing fibers F in this area A of the panel component. Finally, the image t5 of FIG. 6 shows completion of the pyrolysis or depolymerization of the resin matrix M as the heating and removal phase reaches a limit or confinement defined by the cooled region generated by the cooling circuit 9 of the insulator device 8 in the apparatus 1.

Figure 7:
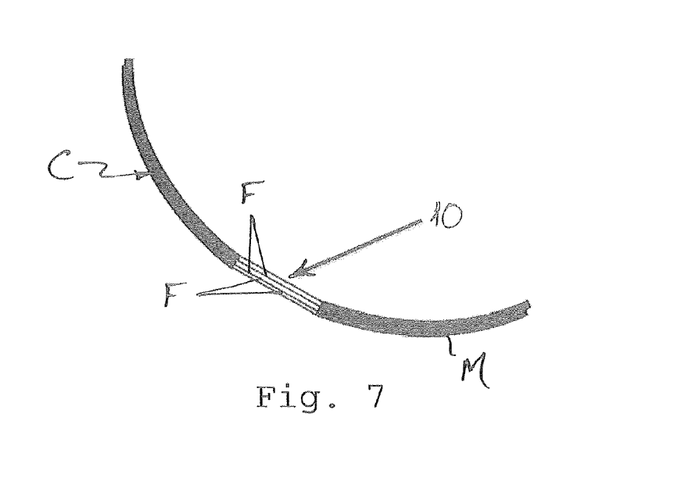
FIG. 7 is a cross-sectional side view of the component of FIG. 1 showing a region of removed polymer matrix.

FIG. 7 of the drawings then illustrates the panel component C (i.e. again in the cross-section X-X) after the state shown in image t5 of FIG. 6 has been reached. Specifically, the polymer matrix material M in and immediately surrounding the damaged area A has been removed from the panel component C to create a space 10 but the reinforcing fibers F in the various layers that were previously embedded within that resin matrix M remain substantially intact.

Figure 8:
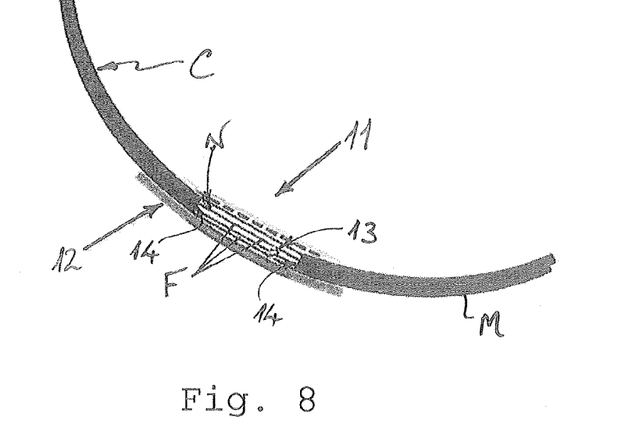
FIG. 8 is a cross-sectional side view of the component of FIG. 7 showing preparation of the region of removed polymer for application of new matrix material.
Figure 9:
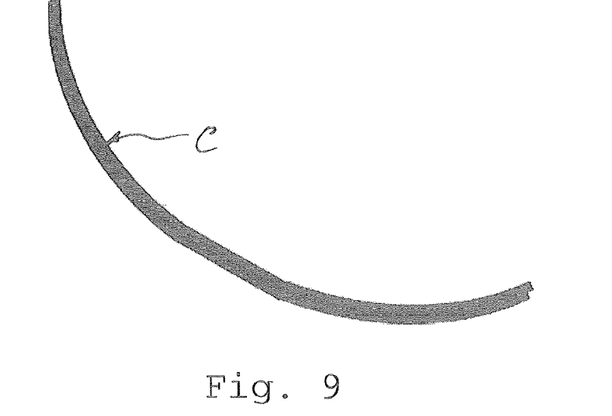
FIG. 9 is a cross-sectional side view of the component of FIG. 1 showing the repaired region.

Referring now to FIG. 8 of the drawings, a molding tool 11 including a cover member 12 may be applied over an outer side of the panel component C such that it covers the space 10 in the damaged area A from which the polymer matrix M has been removed by the pyrolysis performed with the apparatus 1, as described above. The molding tool 11 forms a surface contour in the cover member 12 which essentially corresponds with a desired outer contour of the panel component C and, together with the space 10, forms a mold cavity 13 in the damaged region A for introducing new polymer resin to re-impregnate or infuse the exposed reinforcing fibers F. Thus, the method of this embodiment further includes introducing new polymer resin N into the space 10 in the panel component C created by removal of the matrix material M in order to refill and re-impregnate those reinforcing fibers F. To assist integration of the newly introduced polymer resin N in the component C, a peripheral edge 14 surrounding the space 10 could be prepared (e.g. machined) to provide a profile or shape, such as one or more slot or groove, with which the resin N introduced into the mold cavity 13 may form a mechanical connection in the component C. As a final step, the polymer resin N introduced into the mold cavity 13 and conforming to the desired shape or contour of the panel C can then be cured (for example, in an autoclave or an oven as is known in the art) to complete the repair procedure. FIG. 9 of the drawings illustrates the panel component C again in a cross-section taken in the direction of arrows X-X after the curing of the newly introduced polymer resin and therefore after the entire repair procedure has been completed.

Figure 10:
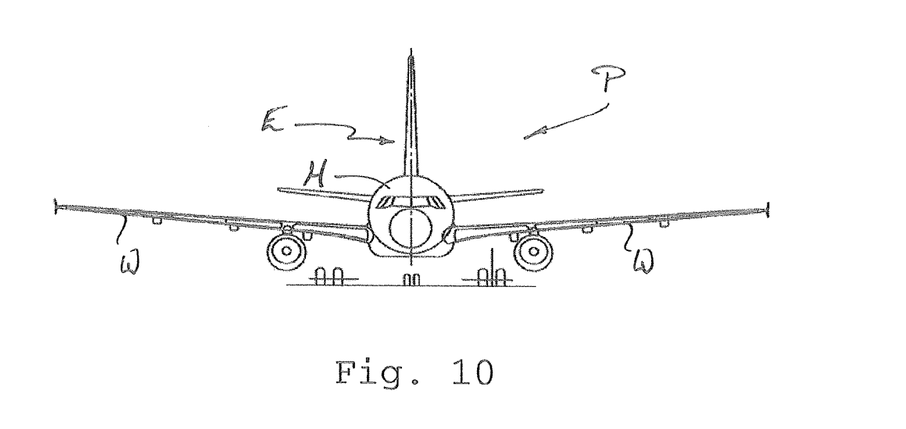
FIG. 10 is a schematic illustration of an aircraft having a fuselage or airframe structure which includes one or more composite component repaired by a method or an apparatus according to the disclosure.

Finally, with reference to FIG. 10, a schematic illustration of an aircraft P is shown having an airframe which includes a fuselage H, wings W, and an empennage E. The airframe of the aircraft P incorporates one or more panel component repaired with a method and/or an apparatus 1 according to a preferred embodiment of the disclosure, for example, as described above with reference to FIG. 1 to FIG. 9.

Although specific embodiments of the disclosure have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In this document, the terms "comprise", "comprising", "include", "including", "contain", "containing", "have", "having", and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects.

The invention claimed is:

1. A method of repairing an affected area of a fiber-reinforced polymer composite component, the method comprising:

providing a controlled atmosphere around the affected area of the component;

heating the component in the affected area within the controlled atmosphere to cause pyrolysis or depolymerization of the polymer matrix in the affected area, to thereby remove the polymer matrix from the affected area; and introducing polymer resin into a space left by the matrix removed by pyrolysis or depolymerization to refill the affected area, wherein introducing polymer resin includes:

covering at least one side of the space in the affected area left by removal of the pyrolyzed or depolymerized matrix with a molding tool to form a mold cavity; and infusing polymer resin into the mold cavity to refill the space.

2. The method according to claim 1, wherein providing a controlled atmosphere around the area includes locally enclosing or isolating the affected area of the component.

3. The method of claim 2, wherein locally enclosing or isolating the affected area of the component includes arranging the affected area in a treatment chamber or cavity.

4. The method according to claim 1, wherein providing a controlled atmosphere includes filling a treatment chamber or cavity that locally encloses or isolates the affected area with a relatively inert or non-reactive gas or gas mixture.

5. The method according to claim 4, wherein providing a controlled atmosphere includes filling a treatment chamber or cavity that locally encloses or isolates the affected area with nitrogen.

6. The method according to claim 1, wherein heating the component in the affected area comprises applying energy locally to the affected area to heat the polymer matrix.

7. The method according to claim 6, wherein the local energy application involves applying at least one of a direct heat source, microwave energy, or laser energy.

8. The method according to claim 6, wherein the polymer matrix of the component in the affected area is heated to a temperature in the range of about 400° C. to about 600° C.

9. The method according to claim 1, wherein heating the component in the affected area includes:

controlling or regulating the heating to maintain a temperature in the affected area of the component within a predetermined range, and/or confining the heating substantially to the affected area.

10. The method according to claim 9, wherein confining the heating substantially to the affected area includes insulating other parts of the component from local application of energy.

11. The method according to claim 10, wherein confining the heating substantially to the affected area includes insulating other parts of the component from local application of energy by cooling at a periphery of the affected area.

12. The method according to claim 1, comprising providing at least one hole or bore which penetrates through the component in the affected area.

13. The method according to claim 12, wherein providing at least one hole or bore comprises drilling through or piercing a portion of the component.

14. The method according to claim 12, comprising providing the at least one hole or bore which penetrates through the component in the affected area by drilling through or piercing a portion of the component.

15. The method of claim 1, wherein fiber-reinforced polymer composite component has elongate or continuous reinforcing fibers in a polymer matrix.

16. The method according to claim 1, wherein the molding tool follows a contour of the component in the affected area, and wherein the polymer resin is cured in the molding tool.

17. An aircraft having an airframe or fuselage structure comprising one or more component fabricated by a method of repairing an affected area of a fiber-reinforced polymer composite component, the method comprising:

providing a controlled atmosphere around the affected area of the component;

heating the component in the affected area within the controlled atmosphere to cause pyrolysis or depolymerization of the polymer matrix in the affected area, thereby to remove the polymer matrix from the affected area; and introducing polymer resin into a space left by the matrix removed by pyrolysis or depolymerization to refill the affected area, wherein at least one side of the space in the affected area left by removal of the pyrolyzed or depolymerized matrix is covered with a molding tool to form a mold cavity; and polymer resin is infused into the mold cavity to refill the space.

* * * * *